(12) United States Patent
Iwashita et al.

(10) Patent No.: US 7,360,391 B2
(45) Date of Patent: Apr. 22, 2008

(54) CONTROL DEVICE FOR SERVO DIE CUSHION

(75) Inventors: Yasusuke Iwashita, Yamanashi (JP); Tadashi Okita, Yamanashi (JP); Hiroyuki Kawamura, Yamanashi (JP); Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 104 days.

(21) Appl. No.: 11/428,344

(22) Filed: Jun. 30, 2006

(65) Prior Publication Data

US 2007/0006629 A1 Jan. 11, 2007

(30) Foreign Application Priority Data

Jul. 5, 2005 (JP) ............... 2005-196402

(51) Int. Cl.
*B21J 9/18* (2006.01)
(52) U.S. Cl. .................. 72/454; 72/14.8; 72/20.3; 72/21.6; 72/443
(58) Field of Classification Search ........... 72/14.8, 72/14.9, 19.8, 20.1, 20.2, 20.3, 20.4, 21.1, 72/21.4, 21.6, 31.11, 351, 441, 443, 454; 100/43, 99; 700/19, 206; 318/560, 567, 318/568.1, 625
See application file for complete search history.

(56) References Cited

U.S. PATENT DOCUMENTS 5,168,738 A 12/1992 Bielfeldt
6,457,964 B1 * 10/2002 Yamaguchi et al. ........ 425/150
6,843,647 B2 * 1/2005 Fujita et al. ................. 425/589
6,874,343 B1 * 4/2005 Ariji ........................... 72/20.1
7,049,775 B2 * 5/2006 Iwashita et al. ............ 318/566
7,069,847 B2 * 7/2006 Teraoka ....................... 100/35
7,143,617 B2 * 12/2006 Futamura et al. ............ 72/20.1
7,293,447 B2 * 11/2007 Iwashita et al. .............. 72/454

FOREIGN PATENT DOCUMENTS

| EP | 0943422 A1 | 9/1999 |
| EP | 1652595 A1 | 5/2006 |
| JP | 7106477 B | 11/1995 |
| JP | 10202327 | 8/1998 |

\* cited by examiner

*Primary Examiner*—Ed Tolan
(74) *Attorney, Agent, or Firm*—Lowe, Hauptman, Ham & Berner, LLP

(57) ABSTRACT

A control device, for a servo die cushion, for precisely performing force control without using a force detector. The control device includes a slide position detecting part for detecting the position of the slide, a storing part for storing information representing a relation between the position of the slide and the speed of the die cushion, the information being predetermined such that the force between the slide and the die cushion is set to a desired force and a die cushion speed commanding part for generating a speed command of the die cushion based on the information and the position of the slide detected by the slide position detecting part.

8 Claims, 4 Drawing Sheets

CONTROL DEVICE FOR SERVO DIE CUSHION

RELATED APPLICATIONS

The present application is based on, and claims priority from, Japanese Application No. 2005-196402, filed Jul. 5, 2005, the disclosure of which is hereby incorporated by reference herein in its entirety.

BACKGROUND OF THE INVENTION

1. Field of the Invention

The present invention relates to a control device for a die cushion mechanism which generates a force, on a slide of a press machine, using a servomotor as a drive source and, in particular, to a control device for controlling the force generated by the die cushion mechanism of the press machine.

2. Description of the Related Art

It is known that a press machine, for press working such as bending, drawing or punching, is provided with a die cushion mechanism, as an attached device, for applying a predetermined force or pressure, during the press working, to a movable support member (generally called a slide) supporting a first mold for press working, the force being generated by another movable member supporting a second mold. The die cushion mechanism is generally configured such that the slide (or the first mold), moving in a mold-clamping direction, directly or indirectly collides with a movable element (generally called as a cushion pad) held at a predetermined pressure and, until the molding is finished, the cushion pad is moved with the slide while applying force or pressure to the slide. During this operation, it is possible to prevent the occurrence of wrinkles in a workpiece to be pressed by, for example, clamping an area around a site, of the workpiece, to be pressed between the cushion pad and the slide.

Many conventional die cushion mechanisms use hydraulic or pneumatic units as driving sources. However, control by a hydraulic or a pneumatic unit may be carried out only under a constant pressure. It is preferable that the pressure during drawing is varied in response to the amount of the drawing, however, the pressure cannot be varied in the hydraulic or the pneumatic unit.

In recent years, therefore, a die cushion mechanism using a servomotor as a driving source has been used to carry out force control, with a fast response, as described in Japanese Unexamined Patent Publication (Kokai) No. 10-202327. In the die cushion mechanism described in this publication, a cushion pad positioned below a slide of a press machine may be upwardly and downwardly moved by a servomotor, corresponding to the rise and fall motions of the slide. In this configuration, the pressure is controlled by applying a free curve, predetermined corresponding to the mold, to a curve of a relation between the pressure of the cushion and the stroke of the cushion corresponding to the position of the cushion pad. Further, Japanese Patent Publication (Kokoku) No. 7-106477 discloses an example in which the pressure of the cushion is controlled according to a load pattern, including a predetermined pressure on the cushion, corresponding to the position of the slide.

In controlling the servo die cushion in the prior art, a force signal for controlling a force or a pressure is necessary and, moreover, a force detector for detecting a force, for generating the force signal, is necessary. However, measurement by the force detector is easily affected by vibration or the like due to rapid acceleration or deceleration of the slide associated with a speeding-up of the motion of the machine. Therefore, the detected force value may include a significant error, whereby the force cannot be exactly controlled.

SUMMARY OF THE INVENTION

Therefore, an object of the present invention is to provide a control device, for a die cushion mechanism, by which the force between the slide and the die cushion may be exactly controlled without using the force detector.

According to the present invention, there is provided a control device, of a servo die cushion of a press machine, for generating a force applied to a slide of the press machine by using a servomotor as a drive source, the control device comprising: a slide position detecting part for detecting the position of the slide; a storing part for storing information representing a relation between the position of the slide and the speed of the die cushion, the information being predetermined such that the force between the slide and the die cushion is set to a desired force; and a die cushion speed commanding part for generating a speed command of the die cushion based on the information and the position of the slide detected by the slide position detecting part.

The slide position detecting part may be replaced with a slide position commanding part for generating a position command of the slide. In this case, the die cushion speed commanding part generates a speed command of the die cushion based on the information and the position command of the slide generated by the slide position commanding part.

The information may be, for example, a data table or a relational expression determined by a preconditioning operation.

The control device may further comprise a die cushion torque commanding part for generating a torque command for the die cushion based on the speed command of the die cushion.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
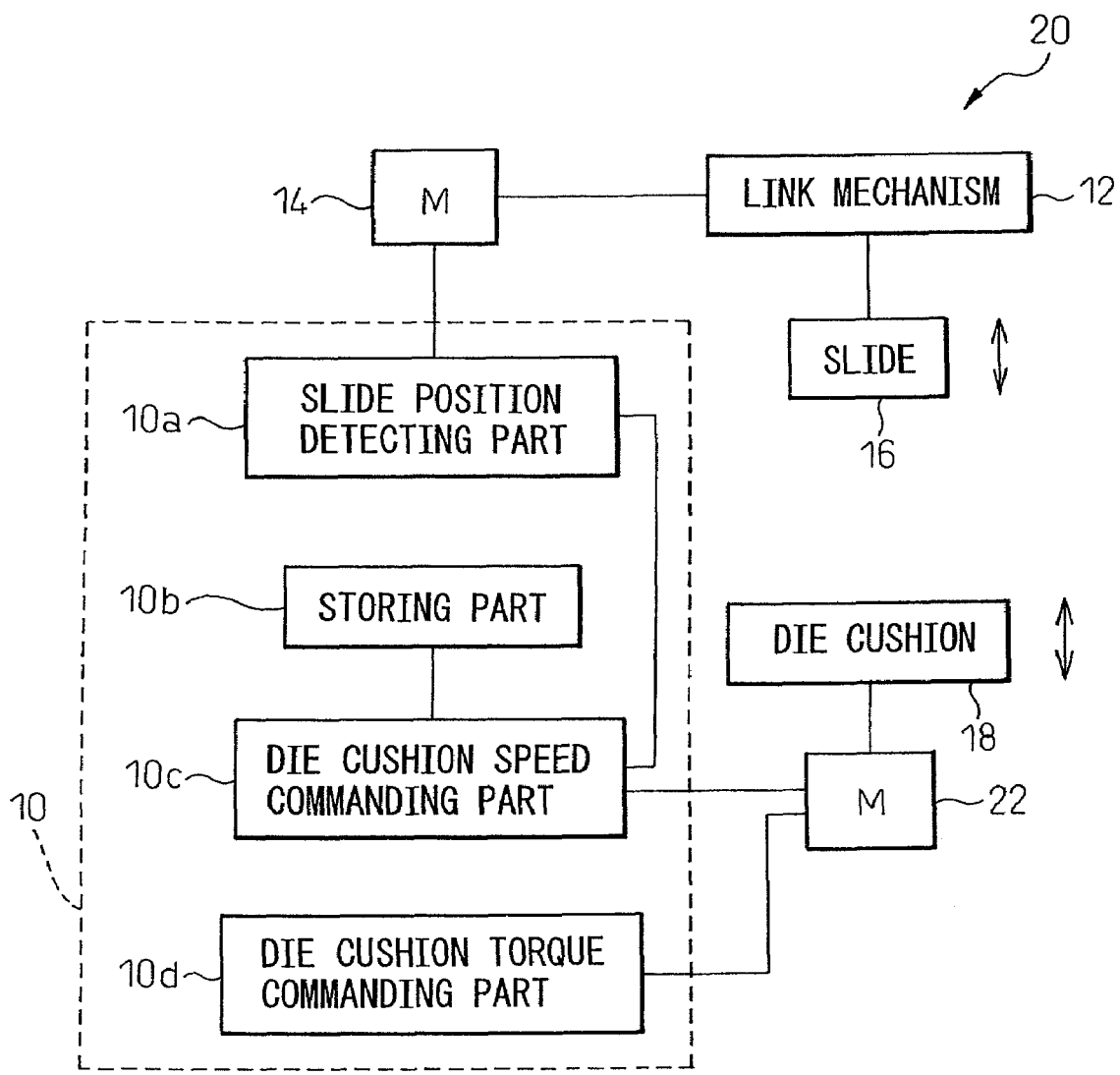
FIG. 1 is a block diagram showing a basic configuration of a press machine including a control device for a servo die cushion according to a first embodiment of the invention.

FIG. 1 is a block diagram showing a basic configuration of a press machine including a control device of a servo die cushion according to a first embodiment of the invention. As shown in FIG. 1, a control device 10 according to a first embodiment of the invention is used for a press machine 20 having a slide 16 driven by a servomotor 14 via a suitable link mechanism 12 and a die cushion 18 capable of moving corresponding to the motion of the slide 16. The control device 10 controls a servomotor 22 for driving the cushion 18 so as to generate a predetermined force or pressure between the die cushion 18 and the slide 16. As the components other than the control device 10 may be the same as the conventional components, the detailed description for the components is omitted below.

The control device 10 includes a slide position detecting part or a detector 10a for detecting the position of the slide 16, a storing part 10b for storing information, such as a data table or a relational expression as described below, representing a relation between the position of the slide 16 and the speed of the die cushion 18, the information being predetermined such that the force between the slide 16 and the die cushion 18 is set to a desired force, and a die cushion speed commanding part 10c for generating a speed command of the die cushion 18 based on the information and the position of the slide 16 detected by the slide position detecting part 10a. The storing part 10b may store the relational expression representing the relation between the position of the slide 16 and the speed of the die cushion 18, instead of the data table.

Next, a fundamental concept of the present invention is explained. In the above press machine 20, the force of the pressure F generated by the die cushion 18 against the slide 16 is expressed by the following equation (1). In this equation, it is assumed that the time t, at the time of collision between the slide and the die cushion, is equal to zero (t=0).

$$\int (Vs - Vd) dt = k \cdot F \quad (1)$$

The values Vs and Vd represent the speeds of the slide and the die cushion, respectively. The value k is a coefficient for converting the value obtained by a left part of the equation (1) to a force value. Also, the equation (1) may be transformed as described by the following equation (2), by using a position value Ps of the slide.

$$Ps - \int (Vd) dt = k \cdot F \quad (2)$$

By means of the equation (2), a commanded speed Vd of the die cushion may be calculated using the slide position and the force F. Therefore, a transfer function may be calculated in which the slide position is used as an input data and the die cushion commanded speed Vd is outputted to obtain a desired force F. Further, upon calculating the die cushion commanded speed, a torque command of the die cushion may be generated by a die cushion torque commanding part 10d, by using another suitable transfer function. The desired force F is determined based on an optimized condition obtained by a preconditioning operation in which a press working is performed in various conditions.

Based on the above concept, the present invention is explained in detail with reference to the drawings and a table. Table 1 indicates the relation between detected slide positions $Ps_1$-$Ps_n$ while a workpiece A is formed by the press machine and commanded die cushion speed values $Vd_1$-$Vd_n$ for obtaining the desired force F. As described above, the table is made based on the relation between the position of the slide and the speed of the die cushion obtained by the preconditioning operation.

TABLE 1

| detected slide position | commanded die cushion speed |
|---|---|
| $Ps_1$ | $Vd_1$ |
| $Ps_2$ | $Vd_2$ |
| $Ps_3$ | $Vd_3$ |
| $Ps_4$ | $Vd_4$ |
| $Ps_5$ | $Vd_5$ |
| . | . |

TABLE 1-continued

| detected slide position | commanded die cushion speed |
|---|---|
| . | . |
| . | . |
| $Ps_n$ | $Vd_n$ |

Figure 2:
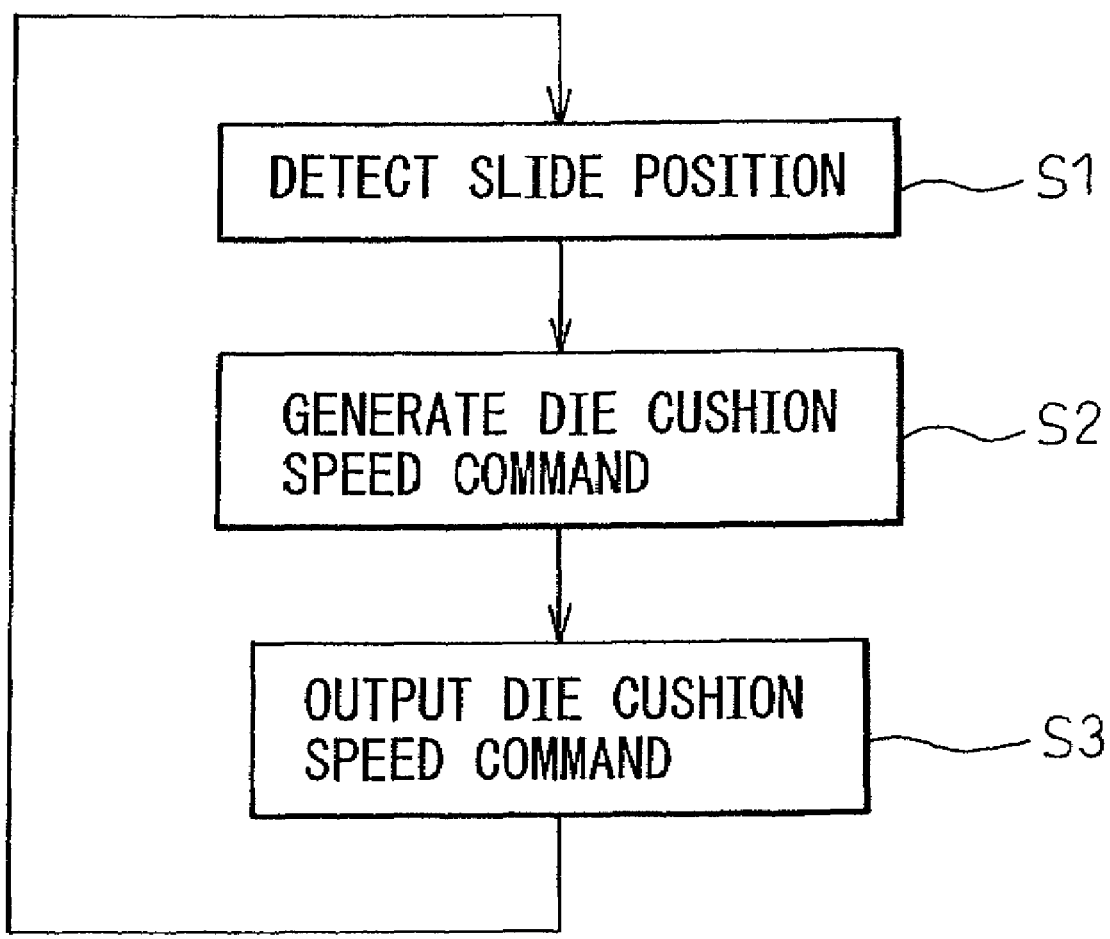
FIG. 2 is a flowchart showing a function of the control device of FIG. 1.

FIG. 2 shows a flowchart for calculating the commanded speed of the die cushion based on the detected position of the slide by means of Table 1. First, the detector 10a detects the slide position Ps at a given time (step S1). Next, the die cushion speed commanding part 10c selects a value, among values $Ps_1$-$Ps_n$, which is equal or closest to the detected slide position Ps (step S2). Then, the speed commanding part 10c outputs a speed command generated by using the equation (2) as described above (step S3), whereby the desired press force may be obtained.

At this point, when the detected slide position is between two positions indicated in Table 1 (for example, between positions $Ps_1$ and $Ps_2$), the commanded speed of the die cushion Vd is determined as below:

when $Ps > Ps_1$, $Vd=0$ (the slide position value increases as the slide is upwardly moved)
when $Ps_1 \geq Ps > Ps_2$, $Vd=Vd_1$
when $Ps_2 \geq Ps > Ps_3$, $Vd=Vd_1$ In other words, when $Ps_n \geq Ps > Ps_{(n+1)}$, Vd is equal to $Vd_n$. Alternatively, the value Vd may be calculated by means of a linear interpolation equation. Otherwise, a suitable relational expression may be used without the data table.

Figure 3:
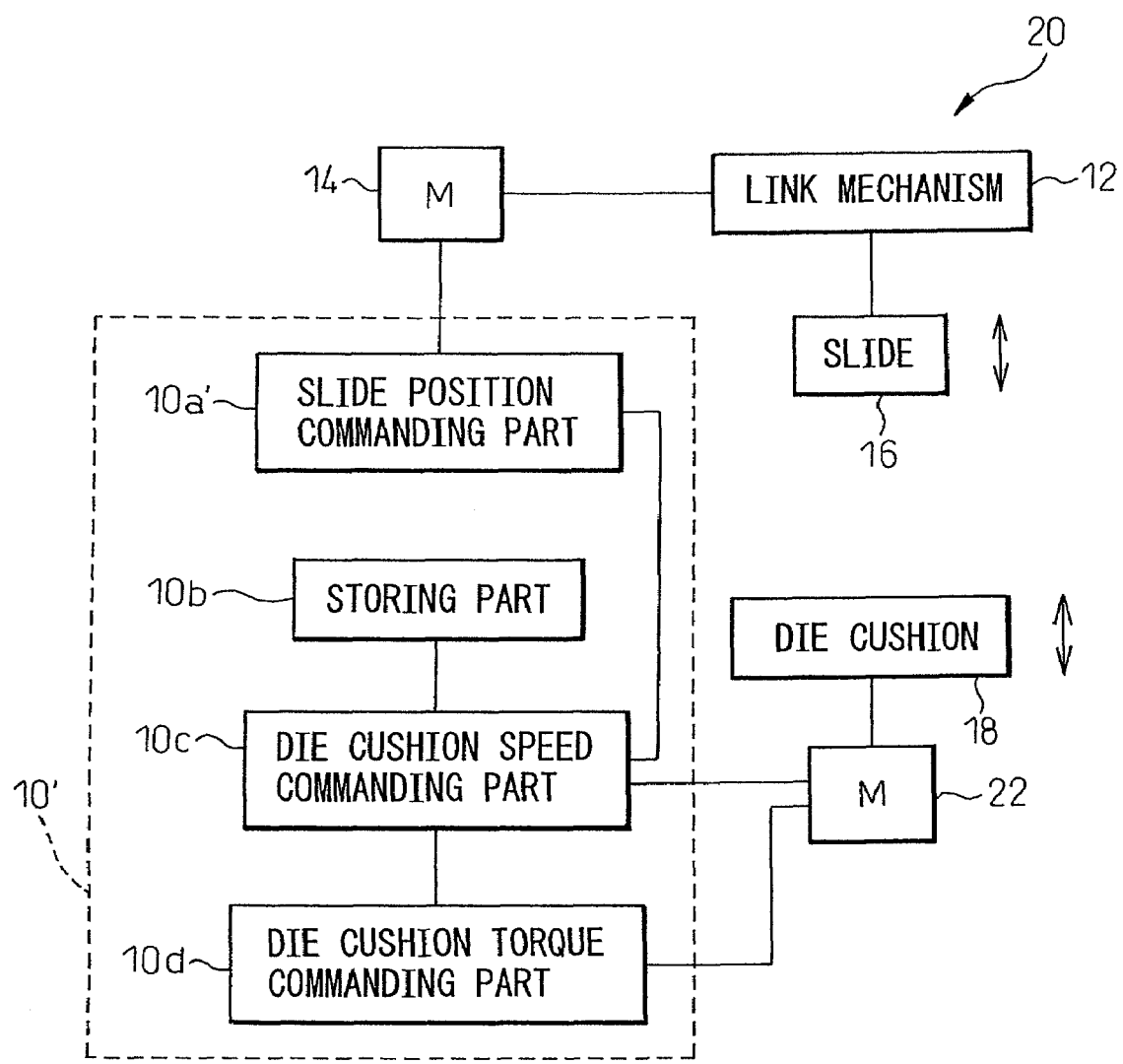
FIG. 3 is a block diagram showing a basic configuration of a press machine including a control device for a servo die cushion according to a second embodiment of the invention.
Figure 4:
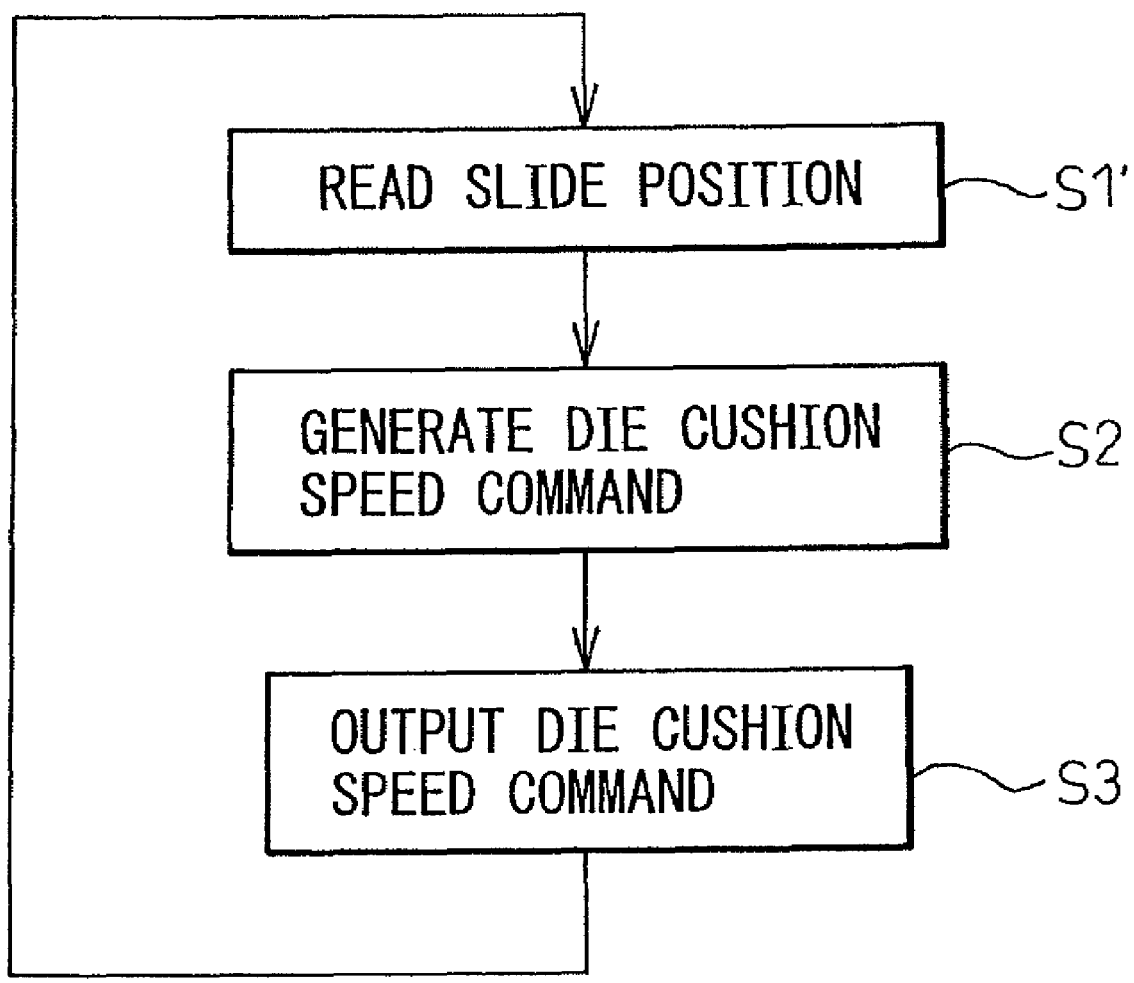
FIG. 4 is a flowchart showing a function of the control device of FIG. 3.

On the other hand, instead of the detected position of the slide, a commanded position of the slide may be used as the input data of the slide position. In this case, a control device 10' according to a second embodiment as shown in FIG. 3 includes a slide position commanding part 10a' for generating a position command of the slide, instead of the detector 10 a. Other components of the device 10' may be the same as those of device 10 of FIG. 1. In a flowchart performed by the control device 10', as shown in FIG. 4, step S1' for reading the commanded position of the slide is used instead of step S1 of the flowchart of FIG. 2. Other steps of FIG. 4 may be the same as those of FIG. 2. In addition, a speed of the slide obtained by differentiating the slide position may be used, instead of the slide position, in order to create a data table or a relational expression based on the above equation (1).

Instead of calculating the speed command or the torque command of the die cushion, a limit value (upper and/or lower limits) of the speed or the torque may be set. In this way, if the press machining to be performed does not require so high a machining accuracy, the die cushion may be freely moved to some extent by setting a range of the commanded value instead of a specified commanded value.

As described above, the optimized speed command or the torque command of the die cushion may be generated without detecting the press force, based on the information obtained by the slide position and the preconditioning operation. In fact, there remains a factor, such as a variation regarding the size of the workpiece, which cannot be completely incorporated into a transfer function. However, as the affect of the factor is negligible small in comparison to the machining accuracy, actual machining is not substantially affected by the factor.

According to the control device of the servo die cushion of the present invention, it is not necessary to use a force detector which is necessary in the prior art. Therefore, the cost of the machine may be reduced and the affect of an error included in the value detected by the force detector, may be eliminated.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device for a servo die cushion of a press machine, for generating a force applied to a slide of the press machine by using a servomotor as a driving source, the control device comprising:
    a slide position detecting part for detecting the position of the slide;
    a storing part for storing information representing a relation between the position of the slide and the speed of the die cushion, the information being predetermined such that the force between the slide and the die cushion is set to a desired force; and
    a die cushion speed commanding part for generating a speed command of the die cushion based on the information and the position of the slide detected by the slide position detecting part.

2. The control device as set forth in claim 1, wherein the information is a data table determined by a preconditioning operation.

3. The control device as set forth in claim 1, wherein the information is a relational expression determined by a preconditioning operation.

4. The control device as set forth in claim 1, wherein the control device further comprises a die cushion torque commanding part for generating a torque command of the die cushion based on the speed command of the die cushion.

5. A control device for a servo die cushion of a press machine, for generating a force applied to a slide of the press machine by using a servomotor as a driving source, the control device comprising:
    a slide position commanding part for generating a position command of the slide;
    a storing part for storing information representing a relation between the position of the slide and the speed of the die cushion, the information being predetermined such that the force between the slide and the die cushion is set to a desired force;
    a die cushion speed commanding part for generating a speed command of the die cushion based on the information and the position command of the slide generated by the slide position commanding part.

6. The control device as set forth in claim 5, wherein the information is a data table determined by a preconditioning operation.

7. The control device as set forth in claim 5, wherein the information is a relational expression determined by a preconditioning operation.

8. The control device as set forth in claim 5, wherein the control device further comprises a die cushion torque commanding part for generating a torque command of the die cushion based on the speed command of the die cushion.

* * * * *